US010908258B2

(12) United States Patent
Reimann et al.

(10) Patent No.: US 10,908,258 B2
(45) Date of Patent: Feb. 2, 2021

(54) METHOD FOR CALIBRATING AN ACTIVE SENSOR SYSTEM

(71) Applicant: Deutsches Zentrum für Luft- und Raumfahrt e.V., Cologne (DE)

(72) Inventors: Jens Reimann, Germering (DE); Björn Döring, Germering (DE); Marco Schwerdt, Landsberg am Ammersee (DE); Daniel Rudolf, Munich (DE); Sebastian Raab, Germering (DE)

(73) Assignee: Deutsches Zentrum für Luft- und Raumfahrt e. V., Cologne (DE)

( * ) Notice: Subject to any disclaimer, the term of this patent is extended or adjusted under 35 U.S.C. 154(b) by 257 days.

(21) Appl. No.: 16/070,459

(22) PCT Filed: Jan. 31, 2017

(86) PCT No.: PCT/EP2017/051986
§ 371 (c)(1),
(2) Date: Jul. 16, 2018

(87) PCT Pub. No.: WO2017/134028
PCT Pub. Date: Aug. 10, 2017

(65) Prior Publication Data
US 2019/0018105 A1  Jan. 17, 2019

(30) Foreign Application Priority Data
Feb. 3, 2016 (DE) .................. 10 2016 101 898

(51) Int. Cl.
*G01S 13/87* (2006.01)
*G01S 7/40* (2006.01)
(Continued)

(52) U.S. Cl.
CPC .............. *G01S 7/40* (2013.01); *G01S 13/87* (2013.01); *G01S 13/876* (2013.01); *G01S 13/90* (2013.01); *G01S 7/497* (2013.01); *G01S 7/52004* (2013.01)

(58) Field of Classification Search
CPC ........ G01S 13/87; G01S 13/876; G01S 13/90; G01S 7/40; G01S 7/497; G01S 7/52004
See application file for complete search history.

(56) References Cited

U.S. PATENT DOCUMENTS 6,300,903 B1 * 10/2001 Richards ................ G01S 13/42
342/357.59

FOREIGN PATENT DOCUMENTS

DE  102014110079 B3   7/2015
GB     2529934 A       3/2016

OTHER PUBLICATIONS

English translation of the International Report on Patentability issued in counterpart International Patent Application No. PCT/EP2017/051986, dated Aug. 7, 2018.
(Continued)

*Primary Examiner* — Timothy A Brainard
(74) *Attorney, Agent, or Firm* — Hoffmann & Baron, LLP

(57) ABSTRACT

Method and system of calibrating a sensor system which comprises sensor A and sensor B. Sensor A has a transmitter $TX_A$ for emitting a signal $S_{TXA}$ and a receiver $RX_A$ for receiving a signal $S_{RXA}$, wherein $RX_A$ and $TX_A$ operate independently in a radar mode of sensor A. Sensor B has a transmitter $TX_B$, a receiver $RX_B$, and a unit D, which is used to connect $TX_B$ to $RX_B$ in a transponder mode of sensor B, with the result that a signal $S_{RXB}$ received by $RX_B$ is emitted again by $TX_B$ as a signal $S_{TXB}$. A gain $G_{con,B}$ between signal $S_{RXB}$ and signal $S_{TXB}$ is predefined. In a radar mode of sensor B, $TX_B$ is not connected to $RX_B$, with the result that $TX_B$ and $RX_B$ operate independently. Emitted signals may be radar,
(Continued)

light, or acoustic signals. The method and system can calibrate radar systems, lidar systems, or sonar systems.

18 Claims, 2 Drawing Sheets

(51) Int. Cl.
*G01S 13/90* (2006.01)
*G01S 7/497* (2006.01)
*G01S 7/52* (2006.01)

(56) References Cited

OTHER PUBLICATIONS

Sebastian Raab, et al., "Comparison of Absolute Radiometric Transponder Calibration Strategies", EUSAR 2014, pp. 382-385.

* cited by examiner

METHOD FOR CALIBRATING AN ACTIVE SENSOR SYSTEM

CROSS-REFERENCE TO RELATED APPLICATIONS

This application is the U.S. National Phase of, and Applicant claims priority from, International Application No. PCT/EP2017/051986, filed 31 Jan. 2017, and German Patent Application No. 10 2016 101 898.8, filed 3 Feb. 2016, both of which are incorporated herein by reference in their entirety.

BACKGROUND

Field

The invention relates to a method for calibrating an active sensor system which comprises at least one active sensor A and one active sensor B. The concept "active" indicates that the sensors A and B actively emit signals.

Discussion of Related Art

The sensor A has a transmitter $TX_A$ for emitting a signal $S_{TXA}$ and a receiver $RX_A$ for receiving a signal $S_{RXA}$, wherein the receiver $RX_A$ and the transmitter TXA operate independently of one another to the greatest possible extent in a RADAR mode of the sensor A. The sensor B has a transmitter $TX_B$, a receiver $RX_B$, and a unit D, by way of which the transmitter $TX_B$ is connected in a transponder mode of the sensor B with the receiver $RX_B$, with the result that a signal $S_{RXB}$ received by the receiver $RX_B$ is emitted again by the transmitter $TX_B$ as a signal $S_{TXB}$. A gain $G_{con,B}$ between the received signal $S_{RXB}$ and the signal $S_{TXB}$ which is emitted again is predefined in this case. In a RADAR mode of the sensor B, the transmitter $TX_B$ is not connected to the receiver $RX_B$, with the result that the transmitter $TX_B$ and the receiver $RX_B$ operate independently of one another.

The emitted signals may be, for example, RADAR signals, light signals or acoustic signals. In this respect, the proposed method is suitable for calibrating RADAR systems, LIDAR systems or SONAR systems, for example.

For the calibration of active sensor systems (for example satellite-supported RADAR or SAR systems, airborne radars or ground-based radars), active and passive reference targets with known backscatter properties are currently deployed.

For the absolute calibration of RADAR systems, for example, primarily corner reflectors (corner reflectors), metal balls and metal plates are used (passively), as well as transponders (actively). The backscattering behavior can be calculated for simple passive targets by approximation. For realistic, complex or active targets, the backscattering behavior must be determined by means of more elaborate measurement technology. The measurement uncertainties thus generated add up and transfer directly to the calibrated active sensor systems. The calibration accuracy decreases as a result.

The backscattering behavior of the reference targets currently used for calibrating such active sensor systems must be known exactly. For these purposes, the backscattering behavior is either captured by means of measurement technology, for instance by means of a calibrated measuring instrument, which further increases the uncertainty as compared to the measuring instrument (as the calibrated accuracy decreases), or it is determined theoretically through simulation or other analytic methods. Both variations are afflicted by errors that affect the achievable total accuracy of the current calibration methods. The feedback of measurement values to a fundamental SI unit as is currently obtained through the calibration of such active sensor systems leads to respectively higher uncertainties. The reference targets currently used are expensive, due to their required magnitude and/or production accuracy, and as a result of their manufacturing tolerances they limit the calibration accuracy of the entire sensor system.

SUMMARY

The task of the invention is to provide an improved calibration method that at least reduces the aforementioned disadvantages.

The invention follows from the characteristics of the independent claims. Advantageous further developments and embodiments are subject of the dependent claims. Additional characteristics, application options, and advantages of the invention follow from the description and from the explanation of exemplary embodiments of the invention shown in the figures.

A first aspect of the invention relates to a method for the (absolute) calibration of a sensor system comprising at least a sensor A and a sensor B. The sensor A has a transmitter TXA for emitting a signal $S_{TXA}$, and a receiver $RX_A$ for receiving a signal $S_{RXA}$, wherein the receiver $RX_A$ and the transmitter $TX_A$ operate independently of one another in a RADAR mode of the sensor A. The sensor B has a transmitter $TX_B$, a receiver $RX_B$, and a unit D, by way of which the transmitter $TX_B$ is connected in a transponder mode of the sensor B with the receiver $RX_B$, with the result that a signal $S_{RXB}$ received by the receiver $RX_B$ is emitted again by the transmitter $TX_B$ as signal $S_{TXB}$, a gain $G_{con,B}$ being predefined between the received signal $S_{RXB}$ and the signal $S_{TXB}$, which is emitted again, and the transmitter $TX_B$ not being connected to the receiver $RX_B$ in a RADAR mode of the sensor B, with the result that the transmitter $TX_B$ and the receiver $RX_B$ operate independently of one another. An object C is available for sending back an impinging signal either actively or passively, and a distance $R_{AB}$ between the sensor A and the sensor B, a distance $R_{AC}$ between the sensor A and the object C, and a distance $R_{BC}$ between the sensor B and the object C are known.

The proposed method comprises the following steps.

In a first step, a signal $S_{TX_i,C}$ is emitted by the transmitter $TX_i$ with a transmission power $P_{TX_i,C}$ to object C, and reception by the receiver $RX_i$ of a signal $S_{RX_i,C}$ subsequently emitted or reflected by the object C with a reception power $P_{RX_i,C}$ for $i \in \{A, B\}$, for determining the following ratios:

$$PV_{AC} = \frac{P_{RX_A,C}}{P_{TX_A,C}} \text{ and } PV_{BC} = \frac{P_{RX_B,C}}{P_{TX_B,C}}$$

wherein:

$$PV_{AC} = \left(\frac{\lambda}{4\pi R_{AC}}\right)^4 \cdot (G_{RX,A} \cdot G_{TX,A}) \cdot \left(\frac{4\pi \sigma_C}{\lambda^2}\right) = 10^{\frac{P_{AC}}{10}}$$

$$PV_{BC} = \left(\frac{\lambda}{4\pi R_{BC}}\right)^4 \cdot (G_{RX,B} \cdot G_{TX,B}) \cdot \left(\frac{4\pi \sigma_C}{\lambda^2}\right) = 10^{\frac{P_{BC}}{10}}$$

wherein:
$(G_{RX,i} \cdot G_{TX,i}) :=$ a hardware gain of sensors i for $i \in \{A, B\}$ that is to be determined, $\lambda$:=wavelength associated with the signals $S_{TX_i,C}$, $$\left(\frac{4\pi\sigma_C}{\lambda^2}\right) := \text{equivalent gain of object } C,$$

and
$\sigma_C$:=radar backscatter cross-section of the object C.

In a second step, a signal $S_{TX_A,B}$ is emitted by the transmitter $TX_A$ with a transmission power $P_{TX_A,B}$ to the sensor B, which is operated in transponder mode with the gain $G_{con,B}$, and the reception by the receiver $RX_A$ of a signal subsequently emitted by the sensor B as $S_{RX_A,B}$ with a reception power $P_{RX_A,B}$ for determining a following ratio:

$$\frac{P_{RX_A,B}}{P_{TX_A,B}} = PV_{AB}$$

wherein $$PV_{AB} = \left(\left(\frac{\lambda}{4\pi R_{AB}}\right)^4 \cdot G_{con,B}\right) \cdot (G_{RX,B} \cdot G_{TX,B}) \cdot (G_{RX,A} \cdot G_{TX,A}) = 10^{\frac{P_{AB}}{10}}.$$

In a third step, calibration factors $F_{cal,i}$ are determined based on or traceable to a following ratio:

$$\begin{pmatrix} F_{cal,A} \\ F_{cal,B} \\ G_C \end{pmatrix} = \frac{1}{2}\begin{pmatrix} 1 & 1 & -1 \\ 1 & -1 & 1 \\ -1 & 1 & 1 \end{pmatrix}\begin{pmatrix} P_{AB} - C_{AB} \\ P_{AC} - C_{AC} \\ P_{BC} - C_{BC} \end{pmatrix}$$

wherein:
$F_{cal,i}$:=$10 \cdot \log(G_{Rx,i} \cdot G_{TX,i} \cdot F_{scale,i})$ for $i \in \{A, B\}$, $$G_C = 10 \cdot \log\left(\frac{4\pi\sigma_C}{\lambda^2}\right),$$

$F_{scale,i}$:=scaling factors, and
$C_{AB}$, $C_{AC}$, $C_{BC}$:=constants depending on $\lambda$ and on the distances $R_{AB}$, $R_{AC}$, and $R_{BC}$.

In a fourth step, sensors A and/or B are calibrated with the calibration factors $F_{cal,i}$.

The first and the second steps may be performed simultaneously or in opposite order.

Typically, the transmitters $TX_A$, $TX_B$ and the receivers $RX_A$, $RX_B$ operate on a predetermined wavelength or frequency band and not exactly on a single wavelength $\lambda$. The specified method may be modified for this purpose in such a manner that the wavelength $\lambda$ specified in the aforementioned forms respectively corresponds to an integral of all frequencies of a band-limited signal emitted by the respective transmitter $TX_i$, with $i \in \{A, B\}$.

Advantageously, the transmitter $TX_B$ comprises a digital-to-analog converter (DAC) and a transmitting antenna, the receiver $RX_B$ comprises an analog-to-digital converter (ADC) and a receiving antenna, and the unit D comprises a unit for digital signal processing, connecting the transmitter $TX_B$ with the receiver $RX_B$ for the purpose of data communication in the transponder mode.

The unit D may comprise, for example, a signal amplifier, a signal filter, a time delay component, a signal shaping component, etc., the modification of the signal in the unit D being known and deterministic. Advantageously, the signals received by receiver $RX_B$ in the transponder mode are amplified and/or filtered and/or time-delayed and/or shaped by the unit D before being conveyed to the transmitter $TX_B$.

Advantageously, sensor A and sensor B are RADAR sensors (RADAR=radio detection and ranging), SONAR sensors (SONAR="sound navigation and ranging), or LIDAR sensors (LIDAR="light detection and ranging).

Advantageously, the distances $R_{AB}$, $R_{AC}$, and $R_{BC}$ meet the following requirement:

$$R_{AB}, R_{AC}, R_{BC} > (2*D^2)/\lambda$$

wherein
D: diameter of the respective transmitting antenna.

In an advantageous further development of the proposed method, steps 1 through 3 are repeated q times, wherein q=1, 2, 3, ..., such that the calibration factors $F_{cal,i}$ are determined as mean values $<F_{cal,i}>_q$ ($i \in \{A, B\}$). Naturally, other averaging methods are covered by the inventive concept as well. The averaging leads to an improvement of the calibration accuracy.

In a typical application example of the proposed calibration method, the sensor A is part of a satellite-based RADAR system, the sensor B is a RADAR transponder, and the object C is a corner reflector. The sensor B and/or the object C may be part of the satellite-based RADAR system as well.

An additional aspect of the invention pertains to a system comprising a sensor A, a sensor B, and a control and evaluation system connected with the two sensors A, B, wherein the control and evaluation system is adapted and designed for the implementation of a method as explained above.

An additional aspect of the invention pertains to a computer system with a data processing device, wherein the data processing device is designed such that a method as explained above is executed on the data processing device.

An additional aspect of the invention pertains to a digital storage medium with electronically readable control signals, wherein the control signals can interact with a programmable computer system, such that a method as described above is executed.

An additional aspect of the invention pertains to a computer program product with a program code, stored on a machine-readable medium, for the implementation of the method as explained above, when the program code is executed on a data processing device.

An additional aspect of the invention pertains to a computer program with program codes for the implementation of the method, as explained above, when the program runs on a data processing device. For these purposes, the data processing device may be embodied as an arbitrary computer system known from prior art.

Additional advantages, characteristics and details follow from the following description, in which at least one exemplary embodiment is described in detail, possibly with reference to the drawings. Identical, similar, and/or analog parts are marked with the same reference numbers.

DETAILED DESCRIPTION

The invention describes a method for calibrating a radar system that is operated either in a stationary manner on the ground or in motion in the atmosphere or in space. Radar systems operated in motion often take the form of so-called "synthetic aperture radars" (SARs) and are often used for ground exploration purposes. The calibration of such complex radar systems, which are often based on so-called "active phased array" antennas and consequently features a plurality of different operating modes, is very complex and costly.

The calibration of a measurement instrument or of a sensor involves generating a connection between measurement values of one or multiple fundamental physical units to the other. There are only seven such fundamental physical units in what is known as the SI System of Units. All other physical units are derived from them.

The proposed method for calibrating a radar system allows for the direct calibration of the absolute system gain of the entire radar system without using a specially assigned radiometric calibration standard. The calibration factors (the connection between measured values and physical units) of the radar system are determined directly by way of comparing at least three units (of which two are sensors) with specific properties.

Figure 1:
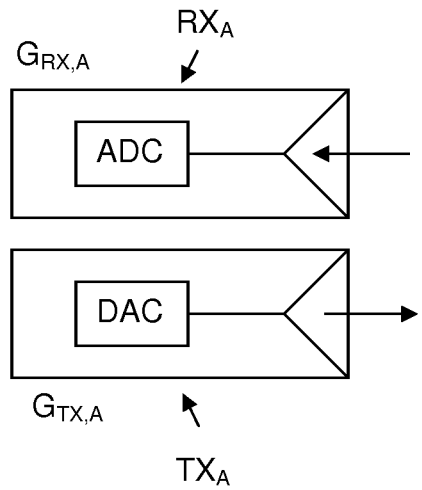
FIG. 1 is a schematic block diagram of sensor A.

At least one of the sensors (sensor A) has a transmitter $TX_A$ for emitting a signal $S_{TXA}$ and a receiver $RX_A$ for receiving a signal $S_{RXA}$, wherein the receiver $RX_A$ and the transmitter $TX_A$ operate independently of one another in a RADAR mode of the sensor A. Sensor A therefore represents a typical sensor, which operates according to the radar principle. FIG. 1 shows a respective block diagram. The receiver $RX_A$ features an analog-to-digital converter (ADC). The transmitter $TX_A$ features a digital-to-analog converter (DAC). In the RADAR mode, the transmitted signal $S_{TXA}$ is independent of a received signal $S_{RXA}$.

Figure 2:
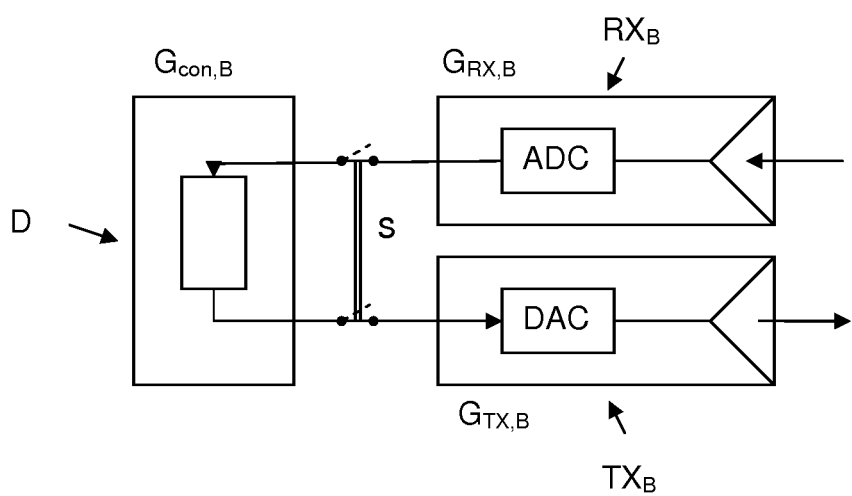
FIG. 2 is a schematic block diagram of sensor B.

FIG. 2 shows a block diagram of sensor B. The second sensor (sensor B) has a transmitter $TX_B$, a receiver $RX_B$, and a unit D, by way of which the transmitter $TX_B$ is connected in a transponder mode of the sensor B with the receiver $RX_B$, with the result that a signal $S_{RXB}$ received by the receiver $RX_B$ is emitted again by the transmitter $TX_B$ as signal $S_{TXB}$, a gain $G_{con,B}$ being predefined between the received signal $S_{RXB}$ and the signal $S_{TXB}$, which is emitted again, and with which the transmitter $TX_B$ is not connected with the receiver $RX_B$ in a RADAR mode of the sensor B, such that the transmitter $TX_B$ and the receiver $RX_B$ operate independently of one another. Switching between transponder mode and RADAR mode is done by way of switch S. In the illustrated form, the sensor B is switched to RADAR mode. The sensor B can therefore operate either according to the transponder principle or according to the radar principle. In the transponder mode (switch S is closed), a signal $S_{RXB}$ received by the receiver $RX_B$ is converted by the analog-to-digital converter into a digital signal and conveyed to unit D. The unit D allows for the modification of the digital signal in a predetermined manner (for example, by way of a predetermined time delay, by way of a predetermined gain, by way of a predetermined filtering, and/or by way of a predetermined shaping, etc.). From unit D, the possibly modified digital signal is transmitted to the transmitter $TX_B$, where it is converted by a digital-to-analog converter (DAC) into an analog signal, which is then emitted via the transmitting antenna.

In the RADAR mode of the sensor B, a signal $S_{TXB}$ is generated and emitted via the antennas of the transmitter $TX_B$. The signal is reflected or sent back and captured by the antenna of the receiver $RX_B$. The switch S is open in this case, such that the unit D is not involved in this case. Advantageously, the unit D is a digital processing unit of which the exact behavior and properties are known.

For the proposed calibration method, the following conditions are necessary:
1. the sensor A is adapted and designed for capturing the backscatter properties of at least two additional objects $T_n$ (n=1, 2, ..., N and N>2,
2. one of these additional objects is the sensor B, capable at least of capturing the backscatter properties of one of the other objects $T_n$. The sensor B must be able to operate both in a transponder mode and a RADAR mode.

The proposed calibration method is explained by way of the example of a RADAR sensor system. A different active sensor system (for example: a SONAR system or a LIDAR system) may be used, as long as it meets the aforementioned conditions.

In the following, a fundamental equation system is described, from which a set of linear equations can be derived and solved. Depending on the properties of the calibrated objects, small differences show up in the equations.

The backscatter properties of an object can be described by way of the so-called radar backscatter cross-section (or "radar cross section", RCS). The radar backscatter cross-section $\sigma_m$ of a transponder m featuring a receiver with a reception gain $G_{RX,m}$, a transmitter with a transmission gain $G_{TX,m}$, and a gain of the unit $D_m$ $G_{con,m}$, may be defined as follows:

$$\sigma_m = \frac{\lambda^2}{4\pi} \cdot G_m = \frac{\lambda^2}{4\pi} \cdot G_{RX,m} \cdot G_{TX,m} \cdot G_{con,m} \quad (1)$$

in which $\lambda$ stands for the wavelength on which the system is operated.

The Capturing of Targets with a Radar System
Active Targets (Case 1)

Using the basic radar equation for point targets, the following is the result for the ratio of received to transmitted output of a sensor n, which captures the target $T_m$:

$$\left.\frac{P_{Rx,n}}{P_{Tx,n}}\right|_{T_m} = G_{Rx,n} \cdot G_{Tx,n} \cdot \frac{\lambda^2}{(4\pi)^3 R^4} \cdot \sigma_m \quad (2)$$

$P_{Rx,n}$ defines the received output, and $P_{Tx,n}$ defines the emitted output of the radar sensor n, $G_{Rx,n}$ defines the gain of the receiver, $G_{Tx,n}$ defines the gain of the transmitter, and R defines the one-way distance from the sensor n to the target $T_m$. The notation $|_{T_m}$ indicates the measurement of the target $T_m$. The measuring system is represented by n.

If equation 1 is inserted into equation (2), the result is:

$$\left.\frac{P_{Rx,n}}{P_{Tx,n}}\right|_{T_m} = \left(\left(\frac{\lambda}{4\pi R}\right)^4 \cdot G_{con,m}\right) \cdot (G_{Rx,m} \cdot G_{Tx,m}) \cdot (G_{Rx,n} \cdot G_{Tx,n}) \quad (3)$$

The first term on the right side $$\left(\left(\frac{\lambda}{4\pi R}\right)^4 \cdot G_{con,m}\right)$$

(case 1) is known, whereas the product $(G_{RX,m} \cdot G_{Tx,n}) \cdot (G_{RX,n} \cdot G_{Tx,n})$ is to be determined.

Logarithmically, equation (3) leads to $$P_n|T_m = C_{nm,1} + G_{n,S} + G_{m,S} \quad (4)$$

wherein for $C_{nm,1}$:

$$C_{nm,1} = 10\log\left(\frac{\lambda}{4\pi R}\right)^4 + 10\log(G_{con,m}) \quad (5)$$

the system gain having to be determined as follows:

$$G_{n,S} = 10\log(G_{Rx,n} \cdot G_{Tx,n}) \quad (6)$$

$$G_{m,S} = 10\log(G_{Rx,m} \cdot G_{Tx,m}) \quad (7)$$

Passive Targets (Case 2)

For this purpose, the RADAR equation (2) must be expanded as follows:

$$\left.\frac{P_{Rx,n}}{P_{Tx,n}}\right|_{T_m} = \left(\frac{\lambda}{4\pi R}\right)^4 \cdot (G_{Rx,n} \cdot G_{Tx,n}) \cdot \left(\frac{4\pi\sigma_m}{\lambda^2}\right) \quad (8)$$

Logarithmically, equation (8) leads to $$P_n|T_m = C_{nm,2} + G_{n,S} + G_{m,P} \quad (9)$$

in which $C_{nm,1}$ is known:

$$C_{nm,2} = 10\log\left(\frac{\lambda}{4\pi R}\right)^4 \quad (10)$$

the system gain having to be determined as follows:

$$G_{n,S} = 10\log(G_{Rx,n} \cdot G_{Tx,n}) \quad (11)$$

$$G_{m,P} = 10\log\left(\frac{4\pi\sigma_m}{\lambda^2}\right) \quad (12)$$

In this case, $G_{m,P}$ is a gain that is proportional to the RADAR backscatter cross section of target m.

Capturing Targets with an Image Radar (Case 3)

The radar backscatter cross-section of a target, captured by an image radar can be described within an image that may have been generated through the processing of the recorded measurement data by way of the integrated pixel intensity with the aid of a calibration factor (a linear time-invariant system is presumed).

The output ratio $$\left.\frac{P_{Rx,n}}{P_{Tx,n}}\right|_{T_m}$$

of equation (3) may be replaced by an image intensity $I_n$ and a scaling factor $F_{scale,n}$. If this approach is followed, a combined calibration factor can be determined, which converts the image intensity directly into backscatter cross sections.

Active Targets (Case 3)

Equation (3) for the radar capture of an active targets lead to:

$$I_n|_{T_m} = \left.\frac{P_{Rx,n}}{P_{Tx,n}}\right|_{T_m} \cdot F_{scale,n} = \quad (13)$$

$$\left(\left(\frac{\lambda}{4\pi R}\right)^4 \cdot G_{con,m}\right) \cdot (G_{Rx,n} \cdot G_{Tx,n} \cdot F_{scale,n}) \cdot (G_{Rx,m} \cdot G_{Tx,m})$$

$$I_n|_{T_m} = \left(\left(\frac{\lambda}{4\pi R}\right)^4 \cdot G_{con,m}\right) \cdot F_{cal,n} \cdot (G_{Rx,m} \cdot G_{Tx,m}) \quad (14)$$

in which $(G_{Rx,n} \cdot G_{Tx,n} \cdot F_{scale,n}) = F_{cal,n}$ is a new combined calibration factor that is to be determined for the system. This calibration factor also comprises any gain resulting from the image generation (for example in case of SAR focusing).

Passive Targets (Case 4)

The aforementioned scaling may be applied to equation (8):

$$I_n|_{T_m} = \left.\frac{P_{Rx,n}}{P_{Tx,n}}\right|_{T_m} \cdot F_{scale,n} = \left(\frac{\lambda}{4\pi R}\right)^4 \cdot (G_{Rx,n} \cdot G_{Tx,n} \cdot F_{scale,n}) \cdot \left(\frac{4\pi\sigma_m}{\lambda^2}\right) \quad (15)$$

The equations (14) and (15), if logarithmically phrased, lead to a linear equation system.

Depending on the calibrated system, the equations (3), (8), (14), and (15) are used in logarithmic representation in order to form a linear equation system.

If, for example, it is assumed that a sensor A operating in the RADAR mode, that a sensor B operates in the transponder mode and measures a corner reflector C, the ratios captured by the sensor A of the transmitted and received outputs $P_A|_{T_B}$ and $P_A|_{T_C}$ can be determined. In an additional step, the sensor B, which now operates in the RADAR mode, measures the corner reflector C. From this, the output ratio $P_B|_{T_C}$ can be determined.

Based on the logarithmic version of equation (3), the following system of linear equation can be phrased:

$$\begin{pmatrix} 1 & 1 & 0 \\ 1 & 0 & 1 \\ 0 & 1 & 1 \end{pmatrix} \cdot \begin{pmatrix} G_{A,S} \\ G_{B,S} \\ G_{C,P} \end{pmatrix} = \begin{pmatrix} P_A|_{T_B} \\ P_A|_{T_C} \\ P_B|_{T_C} \end{pmatrix} - \begin{pmatrix} C_{AB,1} \\ C_{AC,2} \\ C_{BC,3} \end{pmatrix} \quad (16)$$

The constant terms $C_{x,y}$ are defined in the equation (5) and (10). The system gains $G_{x'}$ follow from the equations (6), (7), (11), and (12).

The solution of the equation system is done through the inversion of the matrices:

$$\begin{pmatrix} G_{A,S} \\ G_{B,S} \\ G_{C,P} \end{pmatrix} = \frac{1}{2} \begin{pmatrix} 1 & 1 & -1 \\ 1 & -1 & 1 \\ -1 & 1 & 1 \end{pmatrix} \cdot \begin{pmatrix} P_A|_{T_B} - C_{AB,1} \\ P_A|_{T_C} - C_{AC,2} \\ P_B|_{T_C} - C_{BC,3} \end{pmatrix} \quad (17)$$

The solution of this equation leads to the system gain $G_{A,S}$ of the sensor A, to the system gain $G_{B,S}$ of the sensor B, and to the equivalent gain $G_{C,P}$ of the target C.

It is from the equations (5) and (10), for example, that for calibrating an SAR system, only the measured output ratios, the calibration wavelength λ of the measurement frequency, and the distance R have to be known. For large distances, for example in case of satellite-based SAR systems, the proposed calibration method is less prone to errors as compared to constant offset errors of the measurements.

Even though the aforementioned equations depart from a calibration wavelength A, they cannot be simply transferred to band-limited signals in which an integral of all frequencies is used.

The aforementioned elaborations will be explained again in further detail below by way of an example. The example relates to the calibration of a satellite-based SAR system (sensor A), using a corner reflector (target C) and a radar/transponder (sensor B).

Contrary to the customary calibration method of a satellite-based SAR system, in which a known calibration of a ground-based target is transferred to the satellite, the proposed method makes it possible to calibrate the SAR system on the satellite and the targets in a single step, in other words. The need to calibrate ground targets in advance is removed. The satellite-based SAR system would be the sensor A operated in the RADAR mode. Furthermore, there would be a sensor B, which can be operated both in the transponder mode and in the RADAR mode. In addition, there would be a ground-based target C, which is a corner reflector.

The absolute radiometric calibration of the satellite-based SAR system (sensor A) follows from three relative measurements of output ratios, the familiar distances between the sensors A and B, between the sensor B and the target C, and the wavelength/frequency of the transmitter of the sensors A and B.

In this example, the sensor B is also a satellite-based sensor. To begin with, the sensor A determines the output ratio when scanning the target C and the output ratio when scanning the sensor B, the sensor B operating in the transponder mode. Independently thereof, the sensor B determines the output ratio when scanning the passive target C.

Using the logarithmic version of the three equations (8), (14), and (15) leads to the following equation system (in which the indication of the captured target $XI_{T_m}$ is not specified, for simplification purposes).

$$\begin{pmatrix} 1 & 1 & 0 \\ 1 & 0 & 1 \\ 0 & 1 & 1 \end{pmatrix} \cdot \begin{pmatrix} F_{cal,A} \\ G_{B,S} \\ G_{C,S} \end{pmatrix} = \begin{pmatrix} I_{AB} \\ I_{AC} \\ P_{BC} \end{pmatrix} - \begin{pmatrix} C_{AB,1} \\ C_{AC,2} \\ C_{BC,2} \end{pmatrix} \qquad (18)$$

$I_{AB}$ and $I_{AC}$ are here the measured image intensities (in case of SAR after focusing) of the sensor A for the targets of sensor B and corner reflector C. $P_{BC}$ is the output ratio determined by the transponder B when scanning the corner reflector C. $F_{cal,A}$ is the calibration factor that is to be determined, which converts RCS values directly into image intensities (for this, compare with equation (14)). $G_{C,P}$ is the backscatter cross section-equivalent gain of the corner reflector, and $G_{B,S}$ is the system gain of the transponder (sensor B). The constant part of the three equations follows for:

$$C_{AB,1} = 10\log\left(\frac{\lambda}{4\pi R}\right)^4 + 10\log(G_{con,B}) \qquad (19)$$

$$C_{AC,2} = 10\log\left(\frac{\lambda}{4\pi R}\right)^4 \qquad (20)$$

$$C_{BC,2} = 10\log\left(\frac{\lambda}{4\pi R}\right)^4 \qquad (21)$$

Inverting the system leads to:

$$\begin{pmatrix} F_{cal,A} \\ F_{B,S} \\ G_{C,P} \end{pmatrix} = \frac{1}{2}\begin{pmatrix} 1 & 1 & -1 \\ 1 & -1 & 1 \\ -1 & 1 & 1 \end{pmatrix}\begin{pmatrix} I_{AB} - C_{AB,1} \\ I_{AC} - C_{AC,2} \\ I_{BC} - C_{BC,2} \end{pmatrix} \qquad (22)$$

The backscatter cross section-equivalent gain $G_{C,P}$ of the passive target C is not explicitly necessary for the calibration of the radar system, but may be of interest in order to convert it back into a backscatter cross section (RCS) of the corner reflector C (compare with equation (12)). This also provides an immediate absolute calibration of the target C.

The proposed method for calibrating an active sensor system makes possible an increased calibration accuracy based on less relevant sources of inaccuracy, on the possibility of compensating expansion effects, and on dispensing with reference targets calibrated in advance.

Figure 3:
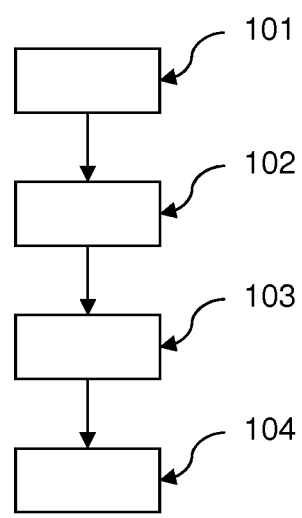
FIG. 3 is a schematic process flow of the proposed calibration method.

FIG. 3 shows a schematic flow of the proposed method for calibrating a sensor system comprising at least a sensor A and a sensor B, the sensor A having a transmitter $TX_A$ for emitting a signal $S_{TXA}$, and a receiver $RX_A$ for receiving a signal $S_{RXA}$, wherein the receiver $RX_A$ and the transmitter $TX_A$ operate independently of one another in a RADAR mode of the sensor A, the sensor B having a transmitter $TX_B$, a receiver $RX_B$, and a unit D, by way of which the transmitter $TX_B$ is connected in a transponder mode of the sensor B with the receiver $RX_B$, with the result that a signal $S_{RXB}$ received by the receiver $RX_B$ is emitted again by the transmitter $TX_B$ as signal $S_{TXB}$, a gain $G_{con,B}$ being predefined between the received signal $S_{RXB}$ and the signal $S_{TXB}$, which is emitted again, and with which the transmitter $TX_B$ is not connected with the receiver $RX_B$ in a RADAR mode of the sensor B, such that the transmitter $TX_B$ and the receiver $RX_B$ operate independently of one another, an object C being available for sending back an impinging signal either actively or passively, and the distance $R_{AB}$ between the sensor A and the sensor B, the distance $R_{AC}$ between the sensor A and the object C, and the distance $R_{BC}$ between the sensor B and the object C being known.

The method comprises the following steps.

In a first step 101, a signal $S_{TX_i,C}$ is emitted by the transmitter $TX_i$ with a transmission power $P_{TX_i,C}$ to the object C, and the capture of the signal $S_{RX_i,C}$ subsequently emitted or reflected from object C by the receiver $RX_i$ with the reception power $P_{RX_i,C}$ for i∈{A, B}, for determining the ratios:

$$PV_{AC} = \frac{P_{RX_A,C}}{P_{TX_A,C}} \text{ and } PV_{BC} = \frac{P_{RX_B,C}}{P_{TX_B,C}}$$

wherein:

$$PV_{AC} = \left(\frac{\lambda}{4\pi R_{AC}}\right)^4 \cdot (G_{RX,A} \cdot G_{TX,A}) \cdot \left(\frac{4\pi \sigma_C}{\lambda^2}\right) = 10^{\frac{P_{AC}}{10}}$$

-continued $$PV_{BC} = \left(\frac{\lambda}{4\pi R_{BC}}\right)^4 \cdot (G_{RX,B} \cdot G_{TX,B}) \cdot \left(\frac{4\pi\sigma_C}{\lambda^2}\right) = 10^{\frac{P_{BC}}{10}}$$

wherein:
$(G_{RX,i} \cdot G_{TX,i})$:=the hardware gain of the sensor i for i∈{A, B} that is to be determined,
$\lambda$:=wavelength associated with signals $S_{TX_i,C}$, $$\left(\frac{4\pi\sigma_C}{\lambda^2}\right) := \text{equivalent gain of object } C,$$

$\sigma_C$:=radar backscatter cross-section of object C.

In a second step 102, a signal $S_{TX_A,B}$ is emitted by the transmitter $TX_A$ with a transmission power $P_{TX_A,B}$ to sensor B, which is operated in transponder mode with the gain $G_{con,B}$, and the reception by the receiver $RX_A$ of the signal subsequently emitted by sensor B as $S_{RX_A,B}$ with the reception power $P_{RX_A,B}$ for determining the following ratio:

$$\frac{P_{RX_A,B}}{P_{TX_A,B}} = PV_{AB}$$

wherein $$PV_{AB} = \left(\left(\frac{\lambda}{4\pi R_{AB}}\right)^4 \cdot G_{con,B}\right) \cdot (G_{RX,B} \cdot G_{TX,B}) \cdot (G_{RX,A} \cdot G_{TX,A}) = 10^{\frac{P_{AB}}{10}}.$$

In a third step 103, calibration factors $F_{cal,i}$ are determined based on or traceable to the following context:

$$\begin{pmatrix} F_{cal,A} \\ F_{cal,B} \\ G_C \end{pmatrix} = \frac{1}{2} \begin{pmatrix} 1 & 1 & -1 \\ 1 & -1 & 1 \\ -1 & 1 & 1 \end{pmatrix} \begin{pmatrix} P_{AB} - C_{AB} \\ P_{AC} - C_{AC} \\ P_{BC} - C_{BC} \end{pmatrix}$$

wherein:
$F_{cal,i} = 10 \cdot \log(G_{RX,i} \cdot G_{TX,i} \cdot F_{scale,i})$ for i∈{A, B}, $$G_C = 10 \cdot \log\left(\frac{4\pi\sigma_C}{\lambda^2}\right),$$

$F_{scale,i}$:=scaling factors, and
$C_{AB}$, $C_{AC}$, $C_{BC}$:=constants depending on $\lambda$ and on the distances $R_{AB}$, $R_{AC}$, and $R_{BC}$.

In a fourth step 104, there is involved the calibration of the sensors A and B using the calibration factors $F_{cal,i}$ and of the target C via the backscatter cross section-equivalent gain $G_C$.

Even though the invention is explained in detail and illustrated by way of preferred example embodiments, the invention is not limited to the disclosed examples, and other variations may be derived from them by the person skilled in the art without leaving the protective scope of the invention. It is therefore clear that there is a plurality of possible variations. It is also clear that example embodiments are really only examples that should not in any way be understood as a limitation of the scope of protection, of the application options, or of the configuration of the invention. In fact, the description above and the description of the figures allow the person skilled in the art to concretely implement the example embodiments while being able, with the knowledge of the disclosed inventive concept, to make numerous amendments, for example with respect to the function or the arrangement of individual elements mentioned in the context of an example embodiment, without leaving the scope of protection defined by the claims and their legally corresponding passages such as the extensive explanations in the description.

REFERENCE LIST

101-104 The steps of the method

The invention claimed is:
1. A method of calibrating a sensor system, the sensor system comprising at least
   a sensor A having a transmitter $TX_A$ to emit signal $S_{TXA}$ and a receiver $RX_A$ to receive a signal $S_{RXA}$, wherein the receiver $RX_A$ and the transmitter $TX_A$ operate independently of one another in RADAR mode of the sensor A and
   a sensor B having a transmitter $TX_B$, a receiver $RX_B$, and a unit D, by way of which the transmitter $TX_B$ is connected in a transponder mode of the sensor B with the receiver $RX_B$, with a result that a signal $S_{RXB}$ received by the receiver $RX_B$ is emitted again by the transmitter $TX_B$ as a signal $S_{TXB}$, a gain $G_{con,B}$ being predefined between the received signal $S_{RXB}$ and the signal $S_{TXB}$, which is emitted again, and with which the transmitter $TX_B$ is not connected with the receiver $RX_B$ in RADAR mode of the sensor B, such that the transmitter $TX_B$ and the receiver $RX_B$ operate independently of one another, wherein
   an object C is available to send back an impinging signal either actively or passively, and there is a distance $R_{AB}$ between the sensor A and the sensor B, a distance $R_{AC}$ between the sensor A and the object C, and a distance $R_{BC}$ between the sensor B and the object C being known, wherein the method comprises:
   1.1. emitting signals $S_{TX_i,C}$ by transmitters $TX_i$ with transmission power $P_{TX_i,C}$ to the object C, capturing signals $S_{RX_i,C}$ subsequently emitted or reflected from the object C by receivers $RX_i$ with reception power $P_{RX_i,C}$ for i∈{A, B}, and determining following ratios:

$$PV_{AC} = \frac{P_{RX_A,C}}{P_{TX_A,C}} \text{ and } PV_{BC} = \frac{P_{RX_B,C}}{P_{TX_B,C}}$$

wherein:

$$PV_{AC} = \left(\frac{\lambda}{4\pi R_{AC}}\right)^4 \cdot (G_{RX,A} \cdot G_{TX,A}) \cdot \left(\frac{4\pi\sigma_C}{\lambda^2}\right) = 10^{\frac{P_{AC}}{10}}$$

$$PV_{BC} = \left(\frac{\lambda}{4\pi R_{BC}}\right)^4 \cdot (G_{RX,B} \cdot G_{TX,B}) \cdot \left(\frac{4\pi\sigma_C}{\lambda^2}\right) = 10^{\frac{P_{BC}}{10}}$$

wherein:
$(G_{RX,i} \cdot G_{TX,i})$:=hardware gain of sensors i for i∈{A, B} that is to be determined,
$\lambda$:=wave length associated with the signals $S_{TX_i,C}$, $$\left(\frac{4\pi\sigma_C}{\lambda^2}\right) := \text{equivalent gain of object } C,$$

and
$\sigma_C$:=radar backscatter cross-section of the object C;
1.2. emitting a signal $S_{TX_A,B}$ by the transmitter $TX_A$ with a transmission power $P_{TX_A,B}$ to the sensor B, which is operated in transponder mode with the gain $G_{con,B}$, and receiving by the receiver $RX_A$ a signal subsequently emitted by the sensor B as $S_{RX_A,B}$ with a reception power $P_{RX_A,B}$, and determining a following ratio:

$$\frac{P_{RX_A,B}}{P_{TX_A,B}} = PV_{AB}$$

wherein $$PV_{AB} = \left(\left(\frac{\lambda}{4\pi R_{AB}}\right)^4 \cdot G_{con,B}\right) \cdot (G_{RX,B} \cdot G_{TX,B}) \cdot (G_{RX,A} \cdot G_{TX,A}) = 10^{\frac{P_{AB}}{10}};$$

1.3. determining calibration factors $F_{cal,i}$ based on or traceable to a following context:

$$\begin{pmatrix} F_{cal,A} \\ F_{cal,B} \\ G_C \end{pmatrix} = \frac{1}{2} \begin{pmatrix} 1 & 1 & -1 \\ 1 & -1 & 1 \\ -1 & 1 & 1 \end{pmatrix} \begin{pmatrix} P_{AB} - C_{AB} \\ P_{AC} - C_{AC} \\ P_{BC} - C_{BC} \end{pmatrix}$$

wherein:
$F_{cal,i} = 10 \cdot \log(G_{RX,i} \cdot G_{TX,i} \cdot F_{scale,i})$ for $i \in \{A, B\}$, $$G_C = 10 \cdot \log\left(\frac{4\pi\sigma_C}{\lambda^2}\right).$$

$F_{scale,i}$=scaling factors, and
$C_{AB}$, $C_{AC}$, $C_{BC}$=constants depending on $\lambda$ and on the distances $R_{AB}$, $R_{AC}$, and $R_{BC}$; and 1.4. calibrating the sensor A with a calibration factor $F_{cal,A}$ and/or the sensor B with a calibration factor $F_{cal,B}$.

2. The method according to claim 1, wherein the wavelength $\lambda$ corresponds to a respective integral of all frequencies of a band-limited signal emitted by a respective transmitter i, with $i \in \{A, B\}$.

3. The method according to claim 1, wherein the transmitter $TX_B$ comprises a digital-to-analog converter and a transmitting antenna, the receiver $RX_B$ comprise an analog-to-digital converter and a receiving antenna, and the unit D is a digital signal processor, wherein the method comprises connecting via the unit D, in transponder mode, the transmitter $TX_B$ with the receiver $RX_B$ for data communication.

4. The method according to claim 1, wherein the sensor A and the sensor B are one of a RADAR sensor, a SONAR sensor, or a LIDAR sensor.

5. The method according to claim 1, wherein the method comprises:
amplifying, filtering, delaying, and/or shaping, via the unit D, signals received from the receiver $RX_B$ in transponder mode; and
conveying the signals as amplified, filtered, delayed, and/or shaped to the transmitter $TX_B$.

6. The method according to claim 1, wherein the distances $R_{AB}$, $R_{AC}$, and $R_{BC}$ meet a following requirement:

$$R_{AB}, R_{AC}, R_{BC} > (2*D^2)/\lambda$$

wherein
D:=a diameter of a respective transmitting antenna.

7. The method according to claim 1, wherein the method comprises:
repeating operations 1.1 through 1.3 q times, wherein q=1, 2, 3, . . . , and determining the calibration factor $F_{cal,A}$ as a mean value $<F_{cal,A}>_q$.

8. The method according to claim 1, wherein the sensor A is part of a satellite-based radar system, the sensor B is a radar transponder, and the object C is a corner reflector or a transponder.

9. The method according to claim 8, wherein the sensor B and/or the object C is part of the satellite-based radar system.

10. A calibration system comprising:
a sensor A having a transmitter $TX_A$ to emit a signal $S_{TXA}$ and a receiver $RX_A$ to receive a signal $S_{RXA}$, wherein the receiver $RX_A$ and the transmitter $TX_A$ operate independently of one another in RADAR mode of the sensor A;
a sensor B having a transmitter $TX_B$, a receiver $RX_B$, and a unit D, by way of which the transmitter $TX_B$ is connected in a transponder mode of the sensor B with the receiver $RX_B$, with a result that a signal $S_{RXB}$ received by the receiver $RX_B$ is emitted again by the transmitter $TX_B$ as a signal $S_{TXB}$, a gain $G_{con,B}$ being predefined between the received signal $S_{RXB}$ and the signal $S_{TXB}$, which is emitted again, and with which the transmitter $TX_B$ is not connected with the receiver $RX_B$ in RADAR mode of the sensor B, such that the transmitter $TX_B$ and the receiver $RX_B$ operate independently of one another, wherein
an object C is available to send back an impinging signal either actively or passively, and there is a distance $R_{AB}$ between the sensor A and the sensor B, a distance $R_{AC}$ between the sensor A and the object C, and a distance $R_{BC}$ between the sensor B and the object C being known; and
a control and evaluation system connected with the sensor A and the sensor B, the control and evaluation system comprising a processing device, and a memory storing instructions that, when executed by the processing device, perform operations comprising:

1.1 emitting signals $S_{TX_i,C}$ by transmitters $TX_i$ with transmission powers $P_{TX_i,C}$ to the object C, capturing signals $S_{RX_i,C}$ subsequently emitted or reflected from the object C by receivers $RX_i$ with reception powers $P_{RX_i,C}$ for $i \in \{A, B\}$, and determining following ratios:

$$PV_{AC} = \frac{P_{RX_A,C}}{P_{TX_A,C}} \text{ and } PV_{BC} = \frac{P_{RX_B,C}}{P_{TX_B,C}}$$

wherein:

$$PV_{AC} = \left(\frac{\lambda}{4\pi R_{AC}}\right)^4 \cdot (G_{RX,A} \cdot G_{TX,A}) \cdot \left(\frac{4\pi\sigma_C}{\lambda^2}\right) = 10^{\frac{P_{AC}}{10}}$$

$$PV_{BC} = \left(\frac{\lambda}{4\pi R_{BC}}\right)^4 \cdot (G_{RX,B} \cdot G_{TX,B}) \cdot \left(\frac{4\pi\sigma_C}{\lambda^2}\right) = 10^{\frac{P_{BC}}{10}}$$

wherein:
$(G_{RX,i} \cdot G_{TX,i})$:=hardware gain of sensors i for $i \in \{A, B\}$ that ax to be determined,
$\lambda$:=wave length associated with the signals $S_{TX_i,C}$, $$\left(\frac{4\pi\sigma_C}{\lambda^2}\right) :=$$

equivalent gain of the object C, and
$\sigma_C$:=radar backscatter cross-section of the object C;

1.2. emitting a signal $S_{TX_A,B}$ by the transmitter $TX_A$ with a transmission power $P_{TX_A,B}$ to the sensor B, which is operated in transponder mode with the gain $G_{con,B}$, and receiving by the receiver $RX_A$ a signal subsequently emitted by the sensor B as $S_{RX_A,B}$ with reception power $P_{RX_A,B}$, and determining a following ratio:

$$\frac{P_{RX_A,B}}{P_{TX_A,B}} = PV_{AB}$$

wherein:

$$PV_{AC} = \left(\left(\frac{\lambda}{4\pi B_{AB}}\right)^4 \cdot G_{con,B}\right) \cdot (G_{RX,B} \cdot G_{TX,B}) \cdot (G_{RX,A} \cdot G_{TX,A}) = 10^{\frac{P_{AB}}{10}};$$

1.3. determining calibration factors $F_{cal,i}$ based on or traceable to a following context:

$$\begin{pmatrix} F_{cal,A} \\ F_{cal,B} \\ G_C \end{pmatrix} = \frac{1}{2}\begin{pmatrix} 1 & 1 & -1 \\ 1 & -1 & 1 \\ -1 & 1 & 1 \end{pmatrix}\begin{pmatrix} P_{AB} - C_{AB} \\ P_{AC} - C_{AC} \\ P_{BC} - C_{BC} \end{pmatrix}$$

wherein:
$F_{cal,i} = 10 \cdot \log(G_{RX,i} \cdot G_{TX,i} \cdot F_{scale,i})$ for $i \in \{A, B\}$, $$G_C = 10 \cdot \log\left(\frac{4\pi \sigma_C}{\lambda^2}\right),$$

$F_{scale,i}$:=scaling factors, and
$C_{AB}$, $C_{AC}$, $C_{BC}$:=constants depending on $\lambda$ and on the distances $R_{AB}$, $R_{AC}$, and $R_{BC}$; and 1.4. calibrating the sensor A with a calibration factor $F_{cal,A}$ and/or the sensor B with a calibration factor $F_{cal,B}$.

11. The calibration system according to claim 10, wherein the wavelength $\lambda$ corresponds to a respective integral of all frequencies of a band-limited signal emitted by a respective transmitter i, with $i \in \{A, B\}$.

12. The calibration system according to claim 10, wherein the transmitter $TX_B$ comprises a digital-to-analog converter and a transmitting antenna, the receiver $RX_B$ comprises an analog-to-digital converter and a receiving antenna, and the unit D is a digital signal processor, wherein the operations comprise connecting via the unit D, in transponder mode, the transmitter $TX_B$ with the receiver $RX_B$ for data communication.

13. The calibration system according to claim 10, wherein the sensor A and the sensor B are one of a RADAR sensor, a SONAR sensor, or a LIDAR sensor.

14. The calibration system according to claim 10, wherein the operations comprise:
 amplifying, filtering, delaying, and/or shaping, via the unit D, signals received from the receiver $RX_B$ in transponder mode; and
 conveying the signals as amplified, filtered, delayed, and/or shaped to the transmitter $TX_B$.

15. The calibration system according to claim 10, wherein the distances $R_{AB}$, $R_{AC}$, and $R_{BC}$ meet a following requirement:

$R_{AB}, R_{AC}, R_{BC} > (2*D^2)/\lambda$ wherein
D:=a diameter of a respective transmitting antenna.

16. The calibration system according to claim 10, wherein the operations comprise:
 repeating operations 1.1 through 1.3 q times, wherein q=1, 2, 3, . . . , and
 determining the calibration factor $F_{cal,A}$ as a mean value $<F_{cal,A}>_q$.

17. The calibration system according to claim 10, wherein the sensor A is part of a satellite-based radar system, the sensor B is a radar transponder, and the object C is a corner reflector or a transponder.

18. The calibration system according to claim 17, wherein the sensor B and/or the object C is part of the satellite-based radar system.

* * * * *